United States Patent
Humphrey et al.

(10) Patent No.: US 10,960,470 B2
(45) Date of Patent: Mar. 30, 2021

(54) SYNTHESIS OF BIMETALLIC NANOPARTICLE CATALYSTS USING MICROWAVE IRRADIATION

(71) Applicant: BOARD OF REGENTS, THE UNIVERSITY OF TEXAS SYSTEM, Austin, TX (US)

(72) Inventors: Simon M. Humphrey, Austin, TX (US); Stephany Garcia, Georgetown, TX (US)

(73) Assignee: BOARD OF REGENTS, THE UNIVERSITY OF TEXAS SYSTEM, Austin, TX (US)

( * ) Notice: Subject to any disclaimer, the term of this patent is extended or adjusted under 35 U.S.C. 154(b) by 648 days.

(21) Appl. No.: 14/782,844

(22) PCT Filed: Apr. 11, 2014

(86) PCT No.: PCT/US2014/033841
§ 371 (c)(1),
(2) Date: Oct. 7, 2015

(87) PCT Pub. No.: WO2014/169235
PCT Pub. Date: Oct. 16, 2014

(65) Prior Publication Data
US 2016/0039008 A1    Feb. 11, 2016

Related U.S. Application Data

(60) Provisional application No. 61/811,542, filed on Apr. 12, 2013.

(51) Int. Cl.
*B22F 9/24* (2006.01)
*B01J 37/34* (2006.01)
(Continued)

(52) U.S. Cl.
CPC ............ *B22F 9/24* (2013.01); *B01D 53/8628* (2013.01); *B01J 23/40* (2013.01); *B01J 23/42* (2013.01);
(Continued)

(58) Field of Classification Search
CPC .. H01M 4/88; H01M 4/02; H01M 4/36; B01J 23/40; B01J 23/42; B01J 23/44;
(Continued)

(56) References Cited

U.S. PATENT DOCUMENTS 6,387,494 B1 * 5/2002 Yanagida .............. B22F 1/0018
428/402
7,575,621 B2 * 8/2009 Vanheusden .......... B22F 1/0018
75/351
(Continued)

FOREIGN PATENT DOCUMENTS

JP    2010-100899       5/2010
WO    2014169235 A1    10/2014

OTHER PUBLICATIONS

Lopez et al. "Synthesis and Characterization of Gold Nanoparticles (AuNPs) and Their Electrophoretic Deposition" ECS Transactions, 29 (1) 171-181. doi:10.1149/1.3532315 (Year: 2010).*
(Continued)

*Primary Examiner* — Alexandra M Moore
(74) *Attorney, Agent, or Firm* — Meunier Carlin & Curfman LLC

(57) ABSTRACT

The present invention provides compositions and methods of making bimetallic metal alloys of composition for example, Rh/Pd; Rh/Pt; Rh/Ag; Rh/Au; Rh/Ru; Rh/Co; Rh/Ir; Rh/Ni; Ir/Pd; Ir/Pt; Ir/Ag; Ir/Au; Pd/Ni; Pd/Pt; Pd/Ag; Pd/Au; Pt/Ni; Pt/Ag; Pt/Au; Ni/Ag; Ni/Au; or Ag/Au prepared using microwave irradiation.

9 Claims, 12 Drawing Sheets

(51) Int. Cl.
| | |
|---|---|
| B22F 1/00 | (2006.01) |
| C22C 1/04 | (2006.01) |
| B01J 23/48 | (2006.01) |
| B01J 23/89 | (2006.01) |
| B01J 35/00 | (2006.01) |
| B01J 23/40 | (2006.01) |
| B01D 53/86 | (2006.01) |
| B01J 23/42 | (2006.01) |
| B01J 23/44 | (2006.01) |
| B01J 23/46 | (2006.01) |
| B01J 23/50 | (2006.01) |
| B01J 23/52 | (2006.01) |
| B01J 35/02 | (2006.01) |
| B01J 37/06 | (2006.01) |
| B01J 37/16 | (2006.01) |
| C22C 5/02 | (2006.01) |
| C22C 5/04 | (2006.01) |
| C22C 5/06 | (2006.01) |

(52) U.S. Cl.
CPC ............ *B01J 23/44* (2013.01); *B01J 23/464* (2013.01); *B01J 23/48* (2013.01); *B01J 23/50* (2013.01); *B01J 23/52* (2013.01); *B01J 23/89* (2013.01); *B01J 35/0013* (2013.01); *B01J 35/026* (2013.01); *B01J 37/06* (2013.01); *B01J 37/16* (2013.01); *B01J 37/346* (2013.01); *B22F 1/0018* (2013.01); *C22C 1/0491* (2013.01); *C22C 5/02* (2013.01); *C22C 5/04* (2013.01); *C22C 5/06* (2013.01); *B01D 2255/102* (2013.01); *B01D 2255/104* (2013.01); *B01D 2255/106* (2013.01); *B01D 2255/9202* (2013.01); *B22F 2999/00* (2013.01)

(58) Field of Classification Search
CPC . B01J 23/464; B01J 23/48; B01J 23/50; B01J 23/52; B01J 23/89; B01J 35/0013; B01J 35/026; B01J 37/06; B01J 37/16; B01J 37/346; B22F 9/24; B22F 1/0018; B22F 2999/00; B01D 53/8628; B01D 2255/102; B01D 2255/104; B01D 2255/106; B01D 2255/9202; C22C 1/0491; C22C 5/02; C22C 5/04; C22C 5/06

See application file for complete search history.

(56) References Cited

U.S. PATENT DOCUMENTS

| | | | | |
|---|---|---|---|---|
| 7,625,637 | B2* | 12/2009 | Kim | B22F 1/0018 |
| | | | | 428/403 |
| 7,749,299 | B2* | 7/2010 | Vanheusden | B22F 1/0018 |
| | | | | 75/362 |
| 8,158,031 | B2* | 4/2012 | Lee | B22F 1/025 |
| | | | | 252/514 |
| 8,361,921 | B2 | 1/2013 | Starz et al. | |
| 8,367,266 | B2 | 2/2013 | Harkness et al. | |
| 9,273,378 | B2 | 3/2016 | Kitagawa et al. | |
| 9,540,712 | B2 | 1/2017 | Kitagawa et al. | |
| 2004/0087441 | A1* | 5/2004 | Bock | B01J 23/462 |
| | | | | 502/313 |
| 2008/0318765 | A1 | 12/2008 | Aradi et al. | |
| 2010/0269635 | A1* | 10/2010 | Vanheusden | B22F 1/0022 |
| | | | | 75/370 |
| 2011/0256197 | A1* | 10/2011 | Southward | B22F 9/24 |
| | | | | 424/405 |

OTHER PUBLICATIONS

Toshima, Naoki et al. "Recent Progress in Bimetallic Nanoparticles: Their Preparation, Structures and Functions". Metal Nanoclusters in Catalysis and Materials Science: The Issue of Size Control. May 20, 2008; pp. 49-75. https://doi.org/10.1016/B978-044453057-8.50005-2 (Year: 2008).*

Tu et al. "Synthesis of Polymer-Stabilized Platinum/Ruthenium Bimetallic Colloids and Their Catalytic Properties for Selective Hydrogenation of Crotonaldehyde." Chinese Journal of Polymer Science, 2005, 23(5), 487-495.

Dahal, et al. "Beneficial Effects of Microwave-Assisted Heating versus Conventional Heating in Noble Metal Nanoparticle Synthesis" ACS NANO, vol. 6, No. 11, 9433-9446, published online Oct. 3, 2012.

Essinger-Hileman, et al. "Aqueous room-temperature synthesis of Au—Rh, Au—Pt, Pt—Rh, and Pd—Rh alloy nanoparticles: fully tunable compositions within the miscibility gaps" Journal of Materials Chemistry, accepted Feb. 2, 2011, 21, 11599-11604.

European Patent Office (ISA), International Search Report and Written Opinion for PCT/US2014/033841, dated Aug. 18, 2014, 16 pp.

Garcia, et al. "Microwave synthesis of Au—Rh core-shell nanoparticles and implications of the shell thickness in hydrogenation catalysis" Chem. Comm (2013).

Jiang, et al. "Recent progress in synergistic catalysis over heterometallic nanoparticles" J. Mater. Chem., 2011, 21, 13705-13725.

Machine Translation of Japan Publ. No. JP 2010-100899, (May 6, 2010)—Specification, claims & abstract, 21 pp.

Svastenko, et al. "Synthesis of nanostructured lean-Nox catalysts by direct laser deposition of monometallic Pt-, Rh- and bimetallic PtRh-nanoparticles on SiO2 support" J Nanopart Res (2008) 10:277-287.

Heuer-Jungemann et al. The Role of Ligands in the Chemical Synthesis and Applications of Inorganic Nanoparticles, Chemical Reviews, 2019, 119, 4819-4880.

Hawley's Condensed Chemical Dictionary, Thirteenth Edition, Can Nostrand Reinhold, New York, 1997, pp. 2-3 and 24.

Garcia et al. Microwave synthesis of classically immiscible rhodium-silver and rhodium-gold alloy nanoparticles: highly active hydrogenation catalysts, ACS Nano, 2014, 8(11), 11512-11521 and supporting information.

Kunal et al. Microwave-Assisted Synthesis of PdxAu100-x Alloy Nanoparticles: A Combined Experimental and Theoretical Assessment of Synthetic and Compositional Effects upon Catalytic Reactivity, ACS Catalysis, 2016, 6, 4882-4893 and supporting information.

* cited by examiner

1:3 Rh:Ag

1:2 Rh:Ag

1:1 Rh:Ag

2:1 Rh:Ag

3:1 Rh:Ag

US 10,960,470 B2

SYNTHESIS OF BIMETALLIC NANOPARTICLE CATALYSTS USING MICROWAVE IRRADIATION

CROSS-REFERENCE TO RELATED APPLICATIONS

This application claims priority to, and is the National Stage of International Application No. PCT/US2014/033841 filed on Apr. 11, 2014 and claims priority to U.S. Provisional Patent Application Ser. No. 61/811,542, filed on Apr. 12, 2013. The contents of both applications are hereby incorporated by reference herein in their entirety.

STATEMENT OF FEDERALLY FUNDED RESEARCH

Not Applicable.

THE NAMES OF THE PARTIES TO A JOINT RESEARCH AGREEMENT

Not Applicable.

INCORPORATION-BY-REFERENCE OF MATERIALS FILED ON COMPACT DISC

Not Applicable.

TECHNICAL FIELD OF THE INVENTION

The present invention relates generally to methods and compositions used to prepare bimetallic metal nanoparticles of various sizes and compositions, which may be used in a range of applications, including catalysis.

BACKGROUND ART

Without limiting the scope of the invention, its background is described in connection with metal/Rh alloy nanoparticles. U.S. Pat. No. 8,367,266, entitled, "Catalyst Layer," discloses a porous catalyst layer formed from discrete particles of unsupported metal, wherein at least 80%, suitably at least 90%, of the discrete particles have a mass of from 1 to 1000 zeptograms, and wherein the catalyst layer has a metal volume fraction of less than 30% and a metal loading of less than 0.09 mg/cm$^2$ is disclosed. The catalyst layer is suitable for use in fuel cells and other electrochemical applications.

U.S. Pat. No. 8,361,921, entitled, "Noble Metal Nanoparticles, a Process for Preparing these and Their Use," discloses nanoparticles which contain noble metals alone or noble metals in combination with base metals. The nanoparticles are embedded in an aqueous solution of a temporary stabilizer based on a polysaccharide.

DISCLOSURE OF THE INVENTION

Bimetallic metal alloys of composition for example, Rh/Ru; Rh/Co; Rh/Ir; Rh/Ni; Rh/Pd; Rh/Pt; Rh/Ag; Rh/Au; Ir/Pd; Ir/Pt; Ir/Ag; Ir/Au; Pd/Ni; Pd/Pt; Pd/Ag; Pd/Au; Pt/Ni; Pt/Ag Pt/Au; Ni/Ag; Ni/Au or Ag/Au can be prepared using microwave irradiation under suitable reaction conditions. Such alloy nanoparticles can be prepared with tunable compositions with respect to the ratio of metals A/B in the approximate range A:B is about 1:10 to 10:1. The average nanoparticle size can also be varied in the approximate range 2-20 nm. The resulting bimetallic alloy nanoparticles can be used in a variety of applications, for example, but not limited to, catalysts for hydrogenation chemistry and NO reduction.

One embodiment of the present invention is one or more bimetallic metal alloy nanoparticles purified comprising: a random mixture of a first metal and a second metal contacting to form a randomly alloyed bimetallic nanoparticle, wherein the first metal comprises Rh, Ir, Pd, Pt, Ni, Ag, Au or a combination thereof and the second metal comprises Ru, Co, Ir, Ni, Pd, Pt, Ag, Au, or a combination thereof The bimetallic metal alloy nanoparticle may have a first metal to second metal ratio of between 1:10 and 10:1 or 1:99 and 99:1. The bimetallic metal alloy nanoparticle may be a Rh/Ru metal alloy nanoparticle; Rh/Co metal alloy nanoparticle; Rh/Ir metal alloy nanoparticle; Rh/Ni metal alloy nanoparticle; Rh/Pd metal alloy nanoparticle; Rh/Pt metal alloy nanoparticle; Rh/Ag metal alloy nanoparticle; Rh/Au metal alloy nanoparticle; Ir/Pd metal alloy nanoparticle; Ir/Pt metal alloy nanoparticle; Ir/Ag metal alloy nanoparticle; Ir/Au metal alloy nanoparticle; Pd/Ni metal alloy nanoparticle; Pd/Pt metal alloy nanoparticle; Pd/Ag metal alloy nanoparticle; Pd/Au metal alloy nanoparticle; Pt/Ni metal alloy nanoparticle; Pt/Ag metal alloy nanoparticle; Pt/Au metal alloy nanoparticle; Ni/Ag metal alloy nanoparticle; Ni/Au metal alloy nanoparticle or Ag/Au metal alloy nanoparticle. Specific examples of the bimetallic metal alloy nanoparticle are a Rh:Au metal alloy nanoparticle; a Rh:Ag metal alloy nanoparticle; a Rh:Pd metal alloy nanoparticle; or a Rh:Pt metal alloy nanoparticle with a ratio of about 1:1; 1:2; 1:3; 2:1; or 3:1. More specific examples of the bimetallic metal alloy nanoparticle is a Rh:Au metal alloy nanoparticle with a ratio of about 70:30; 64:36; 45:54; 23:77; or 15:85; or a Rh:Ag metal alloy nanoparticle with a ratio of about 70:30; 60:40; 51:49; 27:73; 23:77; 17:83; or 45:54. Other examples include an Rh:Pd metal alloy nanoparticle; or An Rh:Pt metal alloy nanoparticle with a ratio of about 1:3; 1:2; 1:1; 2:1; or 3:1.

The purified one or more bimetallic metal alloy nanoparticles may include a metals from the first metal-precursor-complex: second metal-precursor-complex in an approximate ratio of between 1:10 to 10:1; e.g., 1:1; 1:2; 1:3; 1:4; 1:5; 1:6; 1:7; 1:8; 1:9; 1:10; 2:1; 2:3; 2:5; 2:7; 2:9; 3:1; 3:2; 3:4; 3:5; 3:6; 3:7; 3:8; 3:10; 4:1; 4:3; 4:5; 4:7; 4:9; 5:1; 5:2; 5:3; 5:4; 5:6; 5:7; 5:8; 5:9; 6:1; 6:3; 6:5; 6:7; 7:1; 7:2; 7:3; 7:4; 7:5; 7:6; 7:8; 7:9; 7:10; 8:1; 8:3; 8:5; 8:7; 8:9; 9:1; 9:2; 9:4; 9:5; 9:7; 9:8; 9:10; 10:1; 10:3; 10:5; 10:7; 10:9. The purified one or more bimetallic metal alloy nanoparticles may include Rh:Au in a ratio of 70:30; 64:36; 45:54; 23:77; 15:85; and Rh:Au in a ratio of 1:1; 1:2; 1:3; 2:1; or 3:1; and Rh:Ag in a ratio of 70:30; 60:40; 51:49; 27:73; 23:77; 17:83; 45:54; and Rh:Ag in a ratio of 1:3; 1:2; 1:1; 2:1; 3:1; and Rh:Pd a ratio of 1:3; 1:2; 1:1; 2:1; 3:1; and Rh:Pt a ratio of 1:3; 1:2; 1:1; 2:1; 3:1. Other representative bimetallic metal alloy nanoparticles include: Au:Rh in a ratio of 70:30; 64:36; 45:54; 23:77; 15:85; and Au:Rh in a ratio of 1:1; 1:2; 1:3; 2:1; 3:1; and Ag:Rh in a ratio of 70:30; 60:40; 51:49; 27:73; 23:77; 17:83; 45:54; and Ag:Rh in a ratio of 1:3; 1:2; 1:1; 2:1; 3:1; and Pd:Rh a ratio of 1:3; 1:2; 1:1; 2:1; 3:1; and Pt:Rh a ratio of 1:3; 1:2; 1:1; 2:1; or 3:1.

Another embodiment of the present invention includes a method of making bimetallic randomly alloyed nanoparticles by providing a reaction vessel; adding a reaction mixture comprising a first solution of poly(vinylpyrrolidone) and a suitable reducing agent in a first solvent to the reaction vessel; heating the reaction mixture using a microwave; adding a first metal precursors solution comprising a first metal-precursor-complex comprising Rh; Ir; Pd; Pt; Ni;

Ag; or Au to the reaction mixture; adding a second metal precursor solution, comprising a second metal-precursor-complex, comprising Ru; Co; Jr; Ni; Pd; Pt; Ag; Au; or a combination thereof to the reaction mixture; wherein the first metal-precursor-complex to the second metal-precursor-complex is a bimetallic ratio of between 1:99 or 99:1; forming a bimetallic randomly alloyed nanoparticles having a random distribution at the bimetallic ratio; and purifying the one or more bimetallic randomly alloyed nanoparticles. The one or more bimetallic randomly alloyed nanoparticles have a bimetallic ratio of about 1:1; 1:2; 1:3; 2:1; or 3:1. The first metal-precursor-complex: second metal-precursor-complex may be selected from Rh:Pd; Rh:Pt; Rh:Ag; Rh:Au; Rh:Ru; Rh:Co; Rh:Ir; Rh:Ni; Ir:Pd; Ir:Pt; Ir:Ag; Ir:Au; Pd:Ni; Pd:Pt; Pd:Ag; Pd:Au; Pt:Ni; Pt:Ag; Pt:Au; Ni:Ag; Ni:Au; Ag:Au; or a combination thereof The one or more bimetallic randomly alloyed nanoparticles include a Rh:Au bimetallic randomly alloyed nanoparticle; a Rh:Ag bimetallic randomly alloyed nanoparticle; a Rh:Pd bimetallic randomly alloyed nanoparticle; or a Rh:Pt bimetallic randomly alloyed nanoparticle; with a ratio of about 1:1; 1:2; 1:3; 2:1; or 3:1. The bimetallic metal alloy nanoparticle may be a Rh:Au bimetallic randomly alloyed nanoparticle; with a ratio of about 70:30; 64:36; 45:54; 23:77; or 15:85; or a Rh:Ag bimetallic randomly alloyed nanoparticle with a ratio of about 70:30; 60:40; 51:49; 27:73; 23:77; 17:83; or 45:54; or a Rh:Pd bimetallic randomly alloyed nanoparticle or a Rh:Pt metal alloy nanoparticle with a ratio of about 1:3; 1:2; 1:1; 2:1; or 3:1.

In addition, the method may further include the steps of forming a bimetallic metal alloy nanoparticle catalyst by adding a pre-calcined $SiO_2$ to a suspension comprising poly(vinylpyrrolidone)-capped metal complex and the one or more bimetallic metal alloy nanoparticles and/or the step of loading the bimetallic metal alloy nanoparticle catalyst into a quartz U-tube suspended above a porosity frit. The method may also include the steps of sonicating, isolating, washing, and drying, the one or more bimetallic randomly alloyed nanoparticles.

The present invention also provides a bimetallic metal alloy nanoparticle catalyst for hydrogenation chemistry comprising: A random mixture of a first metal, and a second metal contacting to form a randomly alloyed bimetallic nanoparticle, wherein the first metal comprises Rh; Ir; Pd; Pt; Ni; Ag; Au or a combination thereof and the second metal comprises Ru; Co; Ir; Ni; Pd; Pt; Ag; Au; or a combination thereof to form a bimetallic metal alloy nanoparticle catalyst for hydrogenation chemistry. The randomly alloyed bimetallic nanoparticle may be a Rh:Au; or Rh:Ag bimetallic randomly alloyed nanoparticle; with a ratio of about 70:30; 60:40; 51:49; 27:73; 23:77; 17:83; or 45:54. The randomly alloyed bimetallic nanoparticle may be a Rh:Pd bimetallic randomly alloyed nanoparticle; or a Rh:Pt metal alloy nanoparticle with a ratio of about 1:3; 1:2; 1:1; 2:1; or 3:1.

The present invention also provides a bimetallic metal alloy nanoparticle catalyst for NO reduction comprising: a random mixture of a first metal and a second metal contacting to form a randomly alloyed bimetallic nanoparticle, wherein the first metal comprises Rh; Ir; Pd; Pt; Ni; Ag; Au; or a combination thereof and the second metal comprises Ru; Co; Ir; Ni; Pd; Pt; Ag; Au; or a combination thereof to form a bimetallic metal alloy nanoparticle catalyst for NO reduction. The randomly alloyed bimetallic nanoparticle may be a Rh:Au; or Rh:Ag bimetallic randomly alloyed nanoparticle; with a ratio of about 70:30; 60:40; 51:49; 27:73; 23:77; 17:83; or 45:54. The randomly alloyed bimetallic nanoparticle may be a Rh:Pd bimetallic randomly alloyed nanoparticle or a Rh:Pt metal alloy nanoparticle with a ratio of about 1:3; 1:2; 1:1; 2:1; or 3:1.

DESCRIPTION OF THE DRAWINGS

For a more complete understanding of the features and advantages of the present invention, reference is now made to the detailed description of the invention along with the accompanying figures and in which.

DESCRIPTION OF EMBODIMENTS

Figure 1A:
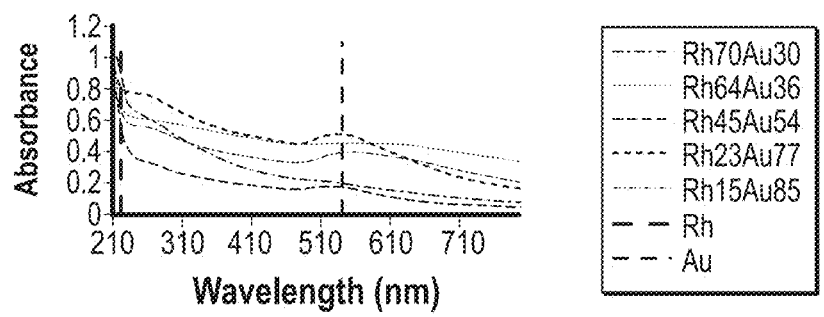
FIG. 1A is an image of the UV-vis spectrum for Rh:Au Alloy NPs.

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

To facilitate the understanding of this invention, a number of terms are defined below. Terms defined herein have meanings as commonly understood by a person of ordinary skill in the areas relevant to the present invention. Terms such as "a", "an" and "the" are not intended to refer to only a singular entity, but include the general class of which a specific example may be used for illustration. The terminology herein is used to describe specific embodiments of the invention, but their usage does not delimit the invention, except as outlined in the claims.

The morphology of metal nanoparticles directly influences their catalytic selectivity due to the intrinsic relationship between surface structure and reactivity. This important correlation has been explored for a multitude of single-crystal surfaces of various catalytically important metals, particularly for the noble metals. For example, simple olefin hydrogenation reactions proceed with high selectivity to give distinct but different products in direct response to the structure of the exposed noble metal surface. Noble metal nanoparticle catalysts as heterogeneous catalysis offer superior surface areas in comparison to single crystals.

Traditionally, noble metal single crystals have been mechanically modified to expose exclusively certain Miller faces in order to impart desired catalytic selectivity; however, nanoparticle analogues cannot be easily prepared by mechanical methods because physical grinding of bulk crystalline metal provides only poorly defined nanosized fragments with mixed surface structures. Instead, well-defined nanoparticles are most conveniently prepared via solution-based, "bottom-up" methods. Most commonly, molecular precursors are reduced in the presence of surface passivation agents, which prevent aggregation and may also impart some control in the growth process. Solution phase nanoparticle synthesis has thus attracted significant recent attention as a means to prepare near-monodisperse nanoparticles with particular predominant surface structures.

Previous studies have relied on conventional (convective) heating of solvents, which involves slow heating and cooling of the solvent medium and the potential for non-uniform temperatures. Microwave assisted heating has attracted significant interest in a range of synthetic fields, including organic synthesis and inorganic materials preparation, owing to the fast reaction times, high-throughput capabilities, and beneficial crystallization effects induced by unusual, localized "hotspot" heating. Specifically regarding metal NP synthesis, microwave chemistry has been employed recently in the synthesis of semiconductor NPs, f-block oxide nanostructures, and some interesting hetero-bimetallic d-metal NP catalysts. However, a systematic and comparative study of the effects of microwave irradiation upon homometallic noble metal NP nucleation and growth still does not exist.

As used herein, the metal precursor compounds for preparing the nanoparticles may also include, for Pt: hexahydroxoplatinic(IV) acid; ethylammonium hexahydroxoplatinate; tetraammineplatinum(II) nitrate; platinum(IV) nitrate; tetraammineplatinum(II) hydroxide solution; for Pd: tetraamminepalladium(II) nitrate; palladium(II) nitrate; palladium(II) sulfate hydrate; for Ru: trinitratonitrosylruthenium (II); ruthenium(III) oxalate hydrate; etc. for Rh: rhodium (III) nitrate hydrate; rhodium(III) sulfate solution; etc. Corresponding compounds may also be used for the noble metals Au; and Ag.

The present invention was heated using microwave radiation, wherein the reaction container was a glass reaction apparatus and heated at 100-250° C. in a microwave oven (CEM Corp, Discover or MARS, 400-1600 W, 2.45 GHz, heating rate, 1° C./sec). General Procedure of Microwave Synthesis. A solution of the organic polymer poly(vinylpyrrolidone) is first dissolved in ethylene glycol solvent in a glass reaction vessel of appropriate volume for the reaction scale, and brought to the chosen reaction temperature under stirring. Two separate solutions containing desired amounts of each metal precursor are prepared in the same solvent and loaded into separate disposable syringes. Alternatively, the metal precursors can both be prepared in the same solvent in the same syringe. The metal precursor solutions are then injected at the same time directly into the reaction solvent, where the rate of the precursor addition is controlled using syringe pump apparatus. The resulting nanoparticle seeds are stirred for a set amount of time at constant reaction temperature, after which time further precursor solutions may be added at a given rate, to obtain larger bimetallic nanoparticles of desired average size. The resulting mixture is stirred for an additional period at constant temperature after completion of precursor addition. The reaction is then cooled rapidly by transferring the reactor vessel to an ice-water bath. The nanoparticles are precipitated by adding excess acetone to give a suspension, which is briefly sonicated. The precipitates are then isolated by ultracentrifugation and the supernatants are decanted away from the solid nanoparticle products. The solids can be further purified to remove excess polymer and ethylene glycol by repeated cycles of dissolution in ethanol followed by precipitation with hexane and isolation by centrifugation.

The final products can be stored at room temperature, suspended in various solvents, such as alcohols, halogenated organic solvents, or mixtures thereof, or stored as dry nanoparticles.

1:1 Rh—Au alloy nanoparticles. A solution of poly(vinylpyrrolidone) (200 mg, 1.8 mmol) and sodium borohydride (21 mg, 0.56 mmol) in ethylene glycol (15.0 mL) was prepared directly in the reaction vessel and brought to 150° C. with stirring. A second solution consisting of $HAuCl_4$ $3H_2O$ (41 mg, 0.10 mmol) and $RhCl_3.x H_2O$ (22 mg, 0.10 mmol) was prepared in the same solvent (5.0 mL) and loaded into a fresh 10 mL disposable syringe. Half of the metal precursor's solution (2.5 mL) was injected into the hot stirred $PVP/NaBH_4$ solution at a rate of 300 mL h$^{-1}$. The color of the solution became rapidly reddish brown. The mixture was stirred for an additional 30 minutes at 150° C. after the precursor was added. After this period, the remaining metal solution (2.5 mL) was added at a rate of 20 mL h$^{-1}$ and the reaction stirred at the same temperature for 30 minutes after completion of the metal solution. The reaction was then cooled rapidly by transferring the reaction vessel to an ice-water bath. The Au/Rh alloy nanoparticles were precipitated by adding acetone (ca. 60 mL) to give a red brown suspension, which was briefly sonicated (<1 minute). The precipitate was then isolated by ultracentrifugation (5 krpm, 5 minutes) and the colorless supernatant was decanted away to leave a brown solid. This was further purified to remove excess PVP and ethylene glycol by 2 cycles of dissolution in ethanol (10 mL) followed by precipitation with hexane (70 mL) and isolation by centrifugation.

1:2 Rh—Au and 1:3 Rh—Au alloy nanoparticles. The above procedure was followed using $NaBH_4$ (20-30 mg, 0.55-0.84 mmol) and $RhCl_3.x H_2O$ (22 mg, 0.10 mmol). The amount of $HAuCl_4.3H_2O$ (84 mg, 0.22 mmol & 113 mg, 0.29 mmol) varied according to the target ratio using the molar amount of $Rh^{3+}$ fixed as an anchor. The exact same volumes and addition rates were used. During the purification stage, the particles underwent 3 cycles of ethanol dissolution/hexane precipitation.

2:1 Rh—Au and 3:1 Rh—Au alloy nanoparticles. Similarly, when the Rh:Au ratio was increased, the amount of $HAuCl_4.3H_2O$ used remained constant, serving as an anchor (40 mg, 0.10 mmol). Thus, the amount of $NaBH_4$ employed remained the same as well (22 mg, 0.55 mmol). The amount of Rh precursor was systematically increased in order to reach the target ratio (43-62 mg, 0.20 mmol-0.30 mmol). All volumes and addition rates were kept constant and the particles were purified as previously seen for 1-1 Rh—Au alloy nanoparticles.

2:1 Rh—Pd and 2:1 Rh—Pt alloy nanoparticles. Following similar parameters as stipulated above, the concentration of $RhCl_3.x H_2O$ remained fixed as an anchor (41 mg, 0.20 mmol) while the molar amount of Pd or Pt used was adjusted in order to achieve the target ratio. The metal precursors used for 2:1 Rh—Pd and 2:1 Rh—Pt alloy nanoparticles were $K_2[PdCl_4]$ (32 mg, 0.10 mmol) and $K_2[PtCl_4]$ (39 mg, 0.10 mmol) respectively. All volumes and addition rates remained the same and the purification of the particles follow the ethanol dispersion/hexane dissolution scheme as stated in previous examples.

1:1 Rh—Ag alloy nanoparticles. A solution of poly(vinylpyrrolidone) (366 mg, 3.29 mmol) in ethylene glycol (20.0 mL) was prepared directly in the reaction vessel and brought to 150° C. with stirring. Once the temperature was reached, 25 μM HCl in the same solvent (1.5 mL) was added very quickly to the hot solution. Two separate solutions of $RhCl_3 \cdot x H_2O$ (29 mg, 0.14 mmol) in ethylene glycol (5.0 mL) and $AgNO_3$ (24 mg, 0.14 mmol) in 5.0 mL of the same solvent were prepared and loaded into separate fresh 10.0 mL syringes. The solutions were then added separately, but simultaneously, at a rate of 150 mL h$^{-1}$, 5 minutes after the acid addition. The color of the solution rapidly changed to brown. The mixture was stirred for an additional 30 minutes at 150° C. after the precursor was added. After this period, the reaction was quenched in an ice water bath and precipitated by adding acetone (105.0 mL). The Rh/Ag precipitate was then collected by centrifugation (5 krpm, 5 minutes). The nanoparticles underwent 2 cycles of ethanol (15.0 mL) dispersion and hexane (105.0 mL) precipitation. Shorter and slower centrifugation periods (2.5 krpm, 3 minutes) were employed in this stage in order to avoid agglomeration.

The purified bimetallic metal alloy nanoparticles also include metals from one or more metal precursors, e.g., a first metal-precursor-complex: second metal-precursor-complex selected from Rh:Ru; Rh:Co; Rh:Ir; Rh:Ni; Rh:Pd; Rh:Pt; Rh:Ag; Rh:Au; Ir:Pd; Ir:Pt; Ir:Ag; Ir:Au; Pd:Ni; Pd:Pt; Pd:Ag; Pd:Au; Pt:Ni; Pt:Ag; Pt:Au; Ni:Ag; Ni:Au; Ag:Au; or a combination thereof Alternatively, the purified bimetallic metal alloy nanoparticles may include metals from the second metal-precursor-complex: first metal-precursor-complex selected from Rh:Ru; Rh:Co; Rh:Ir; Rh:Ni; Rh:Pd; Rh:Pt; Rh:Ag; Rh:Au; Ir:Pd; Ir:Pt; Ir:Ag; Ir:Au; Pd:Ni; Pd:Pt; Pd:Ag; Pd:Au; Pt:Ni; Pt:Ag; Pt:Au; Ni:Ag; Ni:Au; Ag:Au; or a combination thereof.

Specific examples of the bimetallic metal alloy nanoparticles include: Rh:Au in a ratio of 70:30; 64:36; 45:54; 23:77; 15:85; and Rh:Au in a ratio of 1:1; 1:2; 1:3; 2:1; 3:1; and Rh:Ag in a ratio of 70:30; 60:40; 51:49; 27:73; 23:77; 17:83; 45:54; and Rh:Ag in a ratio of 1:3; 1:2; 1:1; 2:1; 3:1; and Rh:Pd a ratio of 1:3; 1:2; 1:1; 2:1; 3:1; and Rh:Pt a ratio of 1:3; 1:2; 1:1; 2:1; 3:1. Other representative bimetallic metal alloy nanoparticles include: Au:Rh in a ratio of 70:30; 64:36; 45:54; 23:77; 15:85; and Au:Rh in a ratio of 1:1; 1:2; 1:3; 2:1; 3:1; and Ag:Rh in a ratio of 70:30; 60:40; 51:49; 27:73; 23:77; 17:83; 45:54; and Ag:Rh in a ratio of 1:3; 1:2; 1:1; 2:1; 3:1; and Pd:Rh a ratio of 1:3; 1:2; 1:1; 2:1; 3:1; and Pt:Rh a ratio of 1:3; 1:2; 1:1; 2:1; or 3:1.

The purified one or more bimetallic metal alloy nanoparticles may include a metal from the first metal-precursor-complex: second metal-precursor-complex in an approximate ratio of between 1:10 to 10:1 (1:99 to 99:1) and every incremental variation thereof, e.g., 1:1; 1:2; 1:3; 1:4; 1:5; 1:6; 1:7; 1:8; 1:9; 1:10; 2:1; 2:3; 2:5; 2:7; 2:9; 3:1; 3:2; 3:4; 3:5; 3:6; 3:7; 3:8; 3:10; 4:1; 4:3; 4:5; 4:7; 4:9; 5:1; 5:2; 5:3; 5:4; 5:6; 5:7; 5:8; 5:9; 6:1; 6:3; 6:5; 6:7; 7:1; 7:2; 7:3; 7:4; 7:5; 7:6; 7:8; 7:9; 7:10; 8:1; 8:3; 8:5; 8:7; 8:9; 9:1; 9:2; 9:4; 9:5; 9:7; 9:8; 9:10; 10:1; 10:3; 10:5; 10:7; 10:9. The inventors have also included ratios that are at every incremental variation of the ratios, e.g., 1:99; 5:95; 10:90; 15:85; 20:80; 25:75; 30:70; 35:65; 40:60; 45:55; 50:50; 55:45; 60:40; 65:35; 70:30; 75:25; 80:20; 85:15; 90:10; 95:5; similarly the ratio may be variations e.g., 5:95; 10:90; 15:85; 20:80; 25:75; 30:70; 35:65; 40:60; 45:55; 50:50; 55:45; 60:40; 65:35; 70:30; 75:25; 80:20; 85:15; 90:10; 95:5; 99:1; and even fractional variations e.g., 1.1:98.9; 5.2:94.8; 10.3:89.7; 15.4:84.6; 20.5:79.5; 25.6:74.4; 30.7:69.3; 35.8:64.2; 40.9: 59.1; 45.1:54.9; 49.6:50.4; 55.5:44.5; 60.1:39.9; 65.6:34.4; 70.8:29.2; 75.9:24.1; 80.1:19.9; 85.2:14.8; 90.4:9.4; 95.7: 4.3; and other variations thereof.

For example, non-limiting examples of the preparation of bimetallic metal nanoparticles from metal-precursor complexes include combining: 0.10 mmol $HAuCl_4$ and 0.10 mmol $RhCl_3$ to form 1:1 Rh:Au alloy nanoparticles; 0.29 mmol $HAuCl_4$ and 0.10 mmol $RhCl_3$ to form 1:3 Rh:Au alloy nanoparticles; 0.10 mmol $HAuCl_4$ and 0.20-0.30 mmol $RhCl_3$ to form 2:1 Rh—Au alloy nanoparticles or 3:1 Rh—Au alloy nanoparticles; 0.10 mmol $K_2[PdCl_4]$ and 0.20 mmol $RhCl_3$ to form 2:1 Rh:Pd alloy nanoparticles; 0.10 mmol $K_2[PtCl_4]$ and 0.20 mmol $RhCl_3$ to form 2:1 Rh:Pt alloy nanoparticles; 0.14 mmol $AgNO_3$ and 0.14 mmol $RhCl_3$ to form 1:1 Rh:Ag alloy nanoparticles. The present invention includes the compositions made by any of the methods disclosed herein.

The present invention provides a method of making bimetallic alloy nanoparticle catalysts by providing a reaction vessel comprising a first solution of poly(vinylpyrrolidone) and a suitable reducing agent if required, such as, but not limited to, $NaBH_4$, in a first solvent; heating and stirring the reaction vessel; preparing one or more metal precursors solution comprising one or more metal-precursor-complex in one or more solvents, wherein the metal-precursor-complex comprises but is not limited to, those listed herein, or a combination thereof; adding a portion of the one or more metal precursor solutions into the reaction vessel; stirring the reaction vessel; adding the remaining one or more metal precursor solutions to the reaction vessel to form one or more bimetallic alloy nanoparticles; cooling rapidly the reaction vessel; precipitating the one or more bimetallic alloy nanoparticles; isolating and purifying the one or more bimetallic alloy nanoparticles; forming a suspension comprising poly(vinylpyrrolidone)-capped metal complexes and the one or more bimetallic alloy nanoparticles; adding a pre-calcined oxide support material to the suspension, such as, but not limited to, those listed herein. The purified one or more bimetallic metal/Rh alloy nanoparticles may include 1:1 alloy nanoparticles of Rh:Au; or Rh:Ag; or Rh:Pd; or Rh:Pt; 1:2 alloy nanoparticles of Rh:Au; or Rh:Ag; or Rh:Pd; or Rh:Pt; 1:3 alloy nanoparticles of Rh:Au; or Rh:Ag; or Rh:Pd; or Rh:Pt; 1:4 alloy nanoparticles of Rh:Au; or Rh:Ag; or Rh:Pd; or Rh:Pt;

2:1 alloy nanoparticles of Rh:Au; or Rh:Ag; or Rh:Pd; or Rh:Pt; 3:1 alloy nanoparticles of Rh:Au; or Rh:Ag; or Rh:Pd; or Rh:Pt; 4:1 alloy nanoparticles of Rh:Au or Rh:Ag; or Rh:Pd; or Rh:Pt; or other ratios of other combinations of metals such as those listed herein.

The metal-precursor-complex may include metal halide salts and hydrated derivatives thereof, for example, but not limited to, $K_2MX_4$, $K_2MX_6$, $H_2MX_6$ (where in all of the previous examples, M=Pd, Pt; X=Cl, Br, I, $NO_3$, or a combination of these and other anions), $MX_3$ (where M=Ru, Os, Co, Rh, Ir, Au), MX (where M=Cu, Ag, Au), $HAuCl_4$, $MX_2$ (where M=Co, Ni, Pd, Pt, Cu), LAuX (where L is a neutral two electron donor, such as a phosphine or organosulfide) wherein M is a first metal-precursor-complex. The method may further include the steps of forming a bimetallic metal alloy nanoparticle catalyst composite by adding a pre-calcined support material in either amorphous, crystalline or nanostructured forms, such as, but not limited to, $MO_2$ (where M=Si, Ti, Zr, Hf, Ce) $M_2O_3$ (where M=Al, V, Nb, Co, Ta), other transition metal oxides such as, but not limited to $UO_3$, $MnO_2$, $CO_2O_3$, NiO, CuO to a suspension comprising PVP-capped bimetallic metal nanoparticles. The method may further include the steps of sonicating, isolating, washing and drying the bimetallic metal alloy nanoparticle catalyst composite material.

Structurally, the bimetallic metal alloy nanoparticles are a random mixture of the first metal and the second metal. As a result, the bimetallic metal alloy nanoparticle has a random mixture of the first metal, and the second metal throughout the alloy nanoparticle. This provides a randomly alloyed surface mixture and randomly alloyed core.

The overall randomness of the bimetallic metal alloy nanoparticles depends on the ratio of the metal-precursor-complexes used, e.g., a Rh:Au alloy nanoparticle in a ratio of 70:30 would have a random distribution of 70 Rh for every 30 Au (i.e., 7 Rh for every 3 Au); a Au:Rh alloy nanoparticle in a ratio of 70:30 would have a random distribution of 30 Rh for every 70 Au; a Rh:Au alloy nanoparticle in a ratio of 64:36 would have a random distribution of 64 Rh for every 36 Au; a Rh:Au alloy nanoparticle in a ratio of 45:54 would have a random distribution of 45 Rh for every 54 Au; Rh:Au alloy nanoparticle in a ratio of 23:77 would have a random distribution of 23 Rh for every 77 Au; and a Rh:Au alloy nanoparticle in a ratio of 15:85 would have a random distribution of 15 Rh for every 85 Au. The randomly alloyed surface mixture and the randomly alloyed core would both share this ratio, e.g., a Au:Rh alloy nanoparticle in a ratio of 70:30 would have a random alloy surface distribution of 70 Rh for every 30 Au and a random alloy core distribution of 70 Rh for every 30 Au.

The catalysts were prepared by addition of pre-calcined $SiO_2$ (200 mg) to suspensions of 5-7 mg of PVP-capped Au and Au/Rh nanoparticles in ethanol/$H_2O$ (1:1). The slurries were sonicated for 20 minutes, isolated by filtration, washed with ethanol/$H_2O$ and dried at 65° C. For each catalytic study, a small amount of the composite catalyst (ca. 5-30 mg) was loaded into a custom made quartz U-tube, suspended above a D3-porosity frit. The sample was mixed in with acid washed and calcined sand, heated to 25° C. and then the sample and entire reactor line (quartz, heated to 90° C.) was purged with the reactant gas mixture ($H_2$/He 1:1) for 30 minutes. Catalysis began with the introduction of cyclohexene vapor into the gas stream via an in-line saturator fitted with fritted bubbler. All data was obtained in real-time by automated pneumatically-gated sampling of the exhaust stream, directly into an HP Agilent 6890

GC fitted with Restex Stabiliwax 15 m column and tandem FID and TCD detectors. Activity and turnover frequency values were obtained based on estimated surface area-to-volume ratios (by TEM).

Figure 1B:
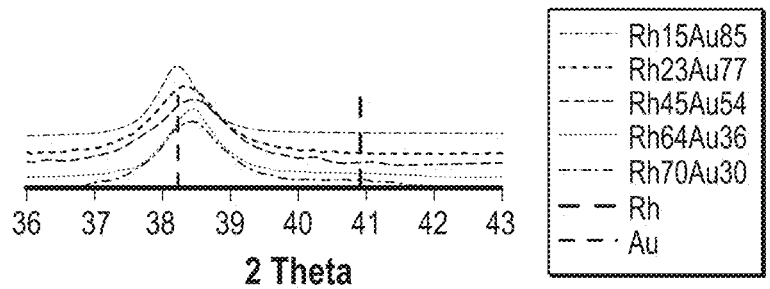
FIG. 1B is an image of the XRD spectrum for Rh:Au Alloy NPs.

FIG. 1A is an image of the UV-vis spectrum for Rh:Au Alloy NPs. FIG. 1B is an image of the XRD spectrum for Rh:Au Alloy NPs.

Figure 2A:
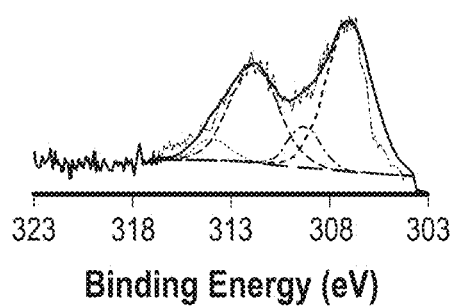
FIGS. 2A, 2B, 3A, 3B, 4A, 4B, 5A, 5B, 6A and 6B are images of Rh 3d and Au 4f XPS spectra for Rh:Au Alloy NPs of different compositions.
Figure 2B:
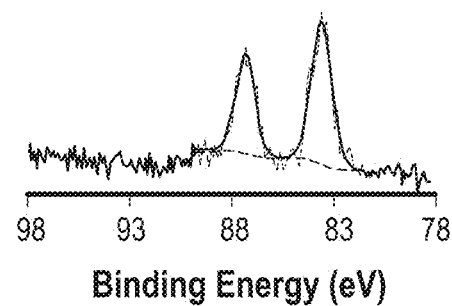
Figure 3A:
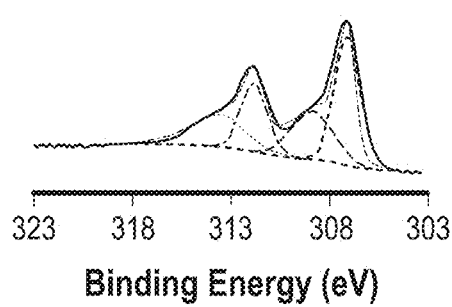
Figure 3B:
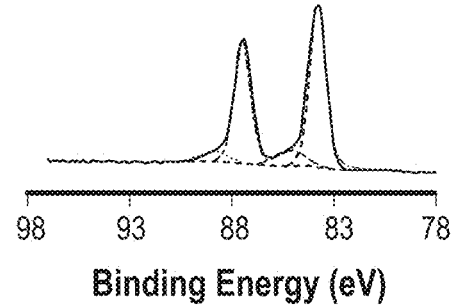
Figure 4A:
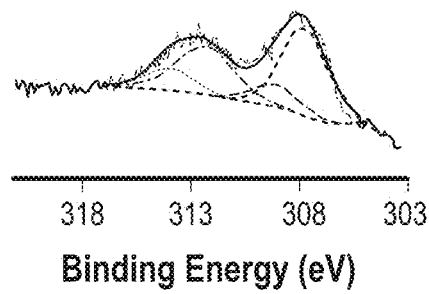
Figure 4B:
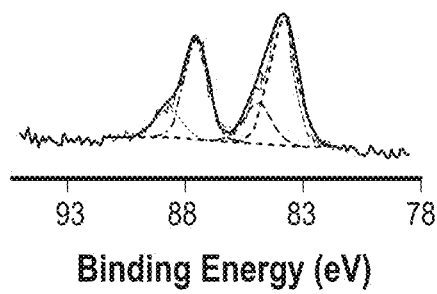
Figure 5A:
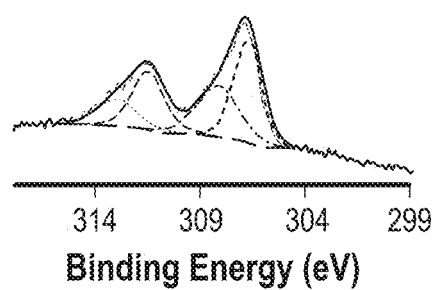
Figure 5B:
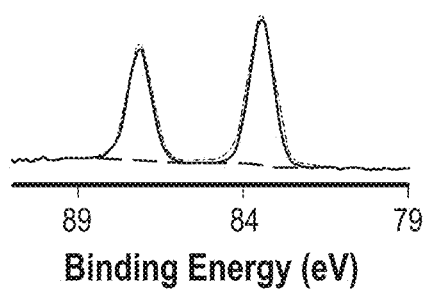
Figure 6A:
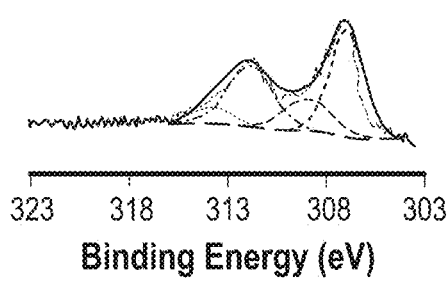
Figure 6B:
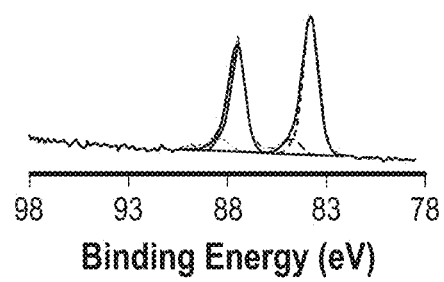

FIGS. 2A-6B are images of Rh 3d and Au 4f XPS spectra for Rh:Au Alloy NPs of different compositions. FIGS. 2A-2B are images of the (FIG. 2A) Rh 3d and (FIG. 2B) Au 4f XPS spectra for 3:1 Rh:Au alloy nanoparticles. FIGS. 3A-3B are images of the (FIG. 3A) Rh 3d and (FIG. 3B) Au 4f XPS spectra for 2:1 Rh:Au alloy nanoparticles. FIGS. 4A-4B are images of the (FIG. 4A) Rh 3d and (FIG. 4B) Au 4f XPS spectra for 1:1 Rh:Au alloy nanoparticles. FIGS. 5A-5B are images of the (FIG. 5A) Rh 3d and (FIG. 5B) Au 4f XPS spectra for 1:2 Rh:Au alloy nanoparticles. FIGS. 6A-6B are images of the (FIG. 6A) Rh 3d and (FIG. 6B) Au 4f XPS spectra for 1:3 Rh:Au alloy nanoparticles.

Figure 7A:
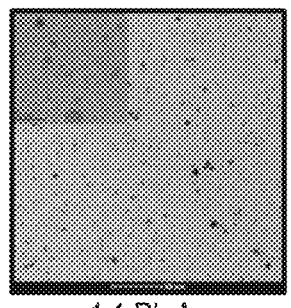
FIGS. 7A-7E are TEM images for Rh:Au Alloy NPs.
Figure 7B:
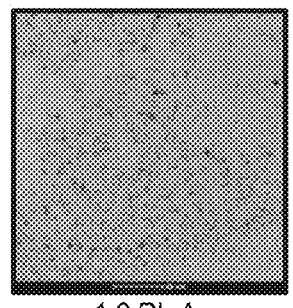
Figure 7C:
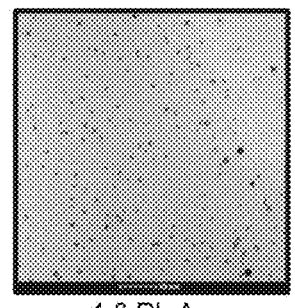
Figure 7D:
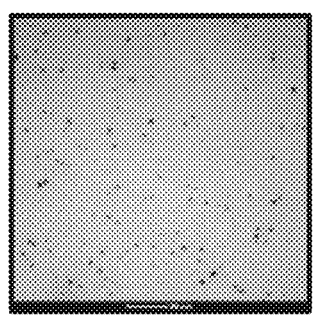
Figure 7E:
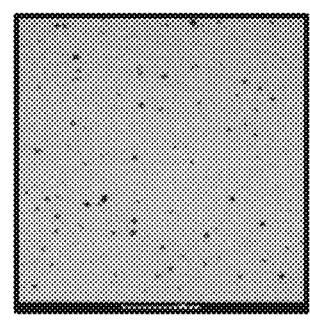

FIGS. 7A-7E are TEM images for Rh:Au Alloy nanoparticles, where FIG. 7A is a TEM image for 1:1 Rh:Au alloy nanoparticles, FIG. 7B is a TEM image for 1:2 Rh:Au alloy nanoparticles, FIG. 7C is a TEM image for 1:3 Rh:Au alloy nanoparticles, FIG. 7D is a TEM image for 2:1 Rh:Au alloy nanoparticles, and FIG. 7E is a TEM images of the spectrum for 3:1 Rh:Au alloy nanoparticles.

Figure 8A:
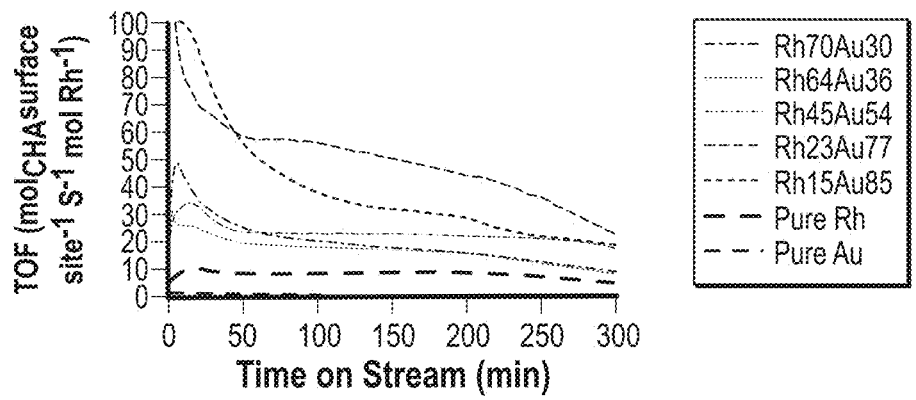
FIGS. 8A-8B are images of the turnover frequency (TOF) plot for Rh:Au Alloy NPs.
Figure 8B:
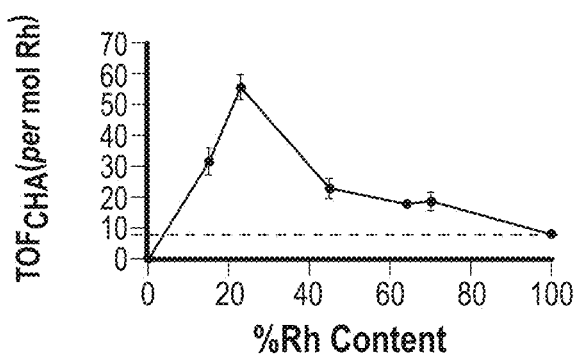

FIGS. 8A-8B are images of the turnover frequency (TOF) plot for Rh:Au Alloy NPs. FIG. 8A shows the turnover frequency plot for cyclohexene hydrogenation using 1:1 Rh:Au alloy nanoparticles, 2:1 Rh:Au alloy nanoparticles, 3:1 Rh:Au alloy nanoparticles, 1:3 Rh:Au alloy nanoparticles, and 1:2 Rh:Au alloy nanoparticles. FIG. 8B shows the steady state turnover frequency with the percent Rh across the bottom.

Figure 9A:
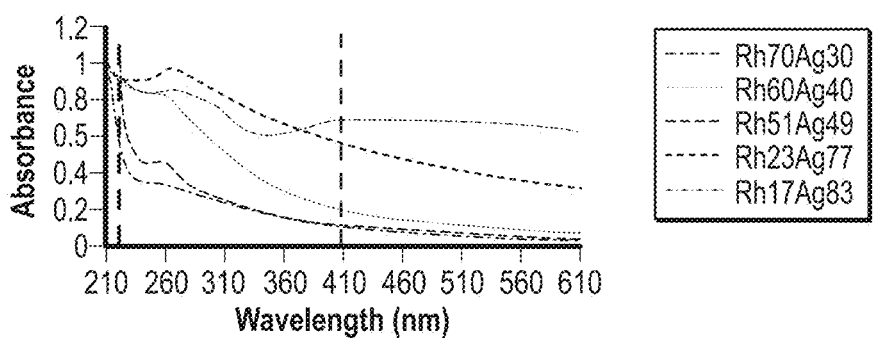
FIG. 9A is an image of the UV-vis spectrum for Rh:Ag Alloy NPs.
Figure 9B:
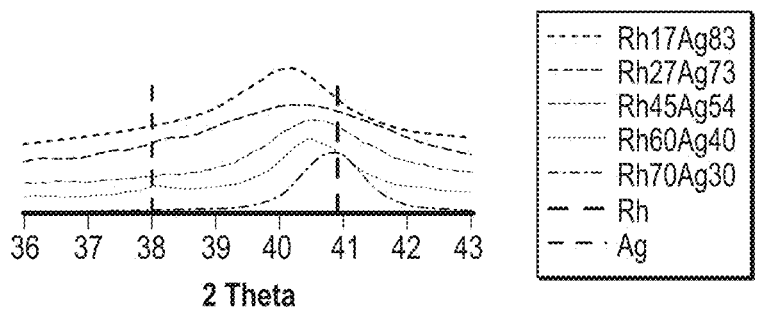
FIG. 9B is an image of the XRD spectrum for Rh:Ag Alloys NPs.

FIG. 9A is an image of the UV-vis spectrum for 3:1 Rh:Ag alloy nanoparticles, 2:1 Rh:Ag alloy nanoparticles, 1:1 Rh:Ag alloy nanoparticles, 1:2 Rh:Ag alloy nanoparticles, 1:3 Rh:Ag alloy nanoparticles, and dashed lines for Rh and Ag references. FIG. 9B is an image of the XRD spectrum (111 reflection) for 3:1 Rh:Ag alloy nanoparticles, 2:1 Rh:Ag alloy nanoparticles, 1:1 Rh:Ag alloy nanoparticles, 1:2 Rh:Ag alloy nanoparticles, 1:3 Rh:Ag alloy nanoparticles, and dashed lines for Rh and Ag references.

Figure 10A:
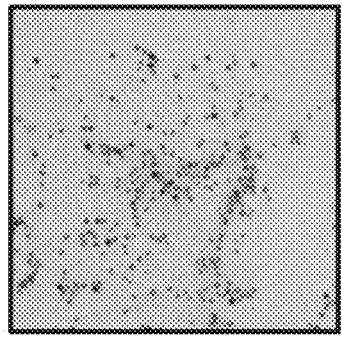
FIGS. 10A-10E, 11A, 11B, 12A, 12B, 13A, 13B, 14A, 14B, 15A, and 15B are images of Rh 3d and Ag 3d XPS spectrum for Rh:Ag Alloy NPs of different compositions.
Figure 10B:
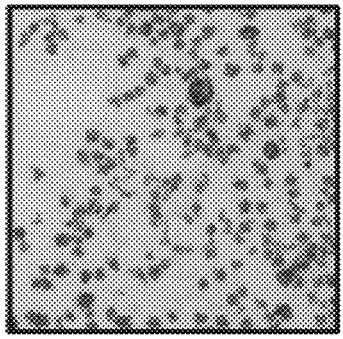
Figure 10C:
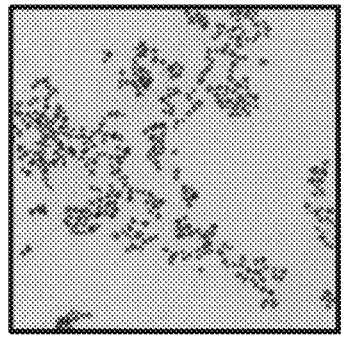
Figure 10D:
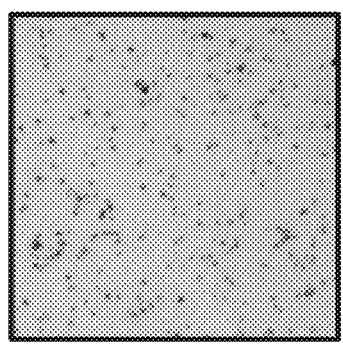
Figure 10E:
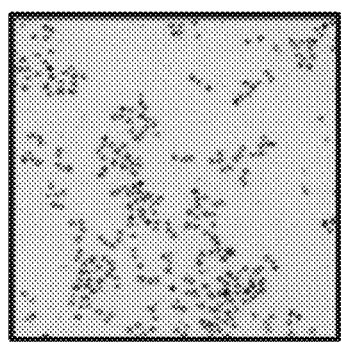

FIGS. 10A-10E TEM images for Rh:Ag Alloy NPs. FIG. 10A is a TEM image for 1:3 Rh:Ag alloy nanoparticles, FIG. 10B is a TEM image for 1:2 Rh:Ag alloy nanoparticles, FIG. 10C is a TEM image for 1:1 Rh:Ag alloy nanoparticles, FIG. 10D is a TEM image for 2:1 Rh:Ag alloy nanoparticles, and FIG. 10E is a TEM images of the spectrum for 3:1 Rh:Ag alloy nanoparticles.

Figure 11A:
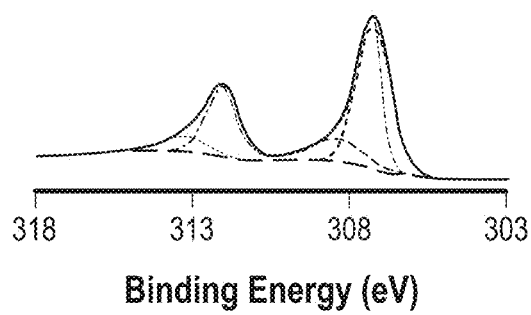
Figure 11B:
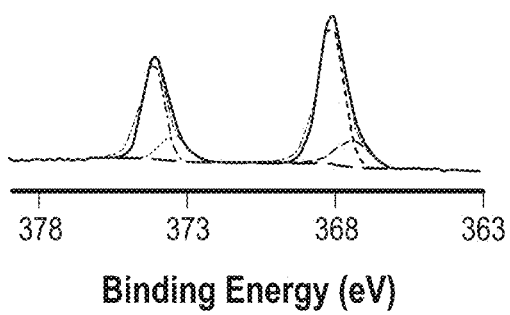

FIGS. 10A-10E, 11A, 11B, 12A, 12B, 13A, 13B, 14A, 14B, 15A, and 15B are images of Rh 3d and Ag 3d XPS spectrum for Rh:Ag Alloy NPs of different compositions. FIGS. 11A-11B are images of the (FIG. 11A) Rh 3d and (FIG. 11B) Au 4f XPS spectra for 3:1 Rh:Ag alloy nanoparticles.

Figure 12A:
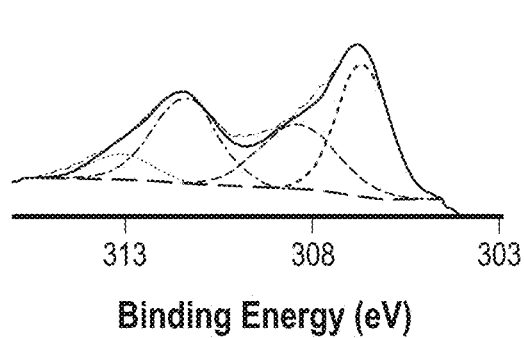
Figure 12B:
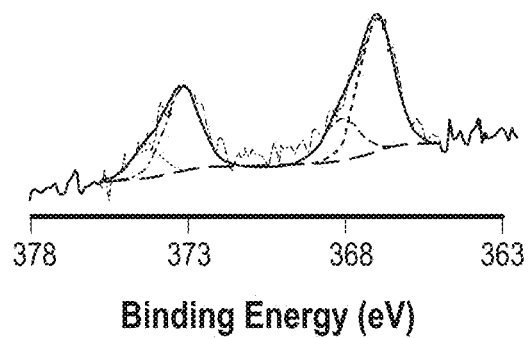
Figure 13A:
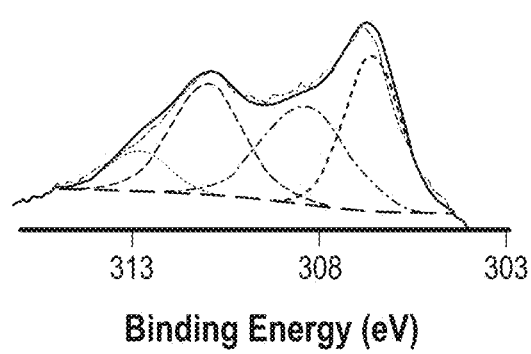
Figure 13B:
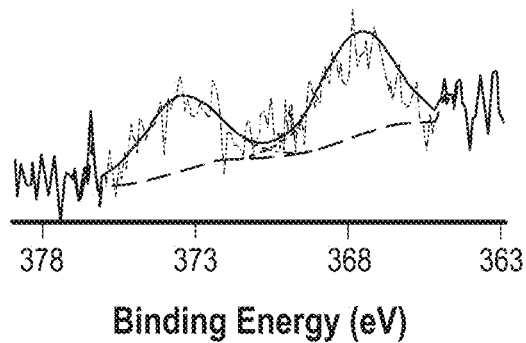
Figure 14A:
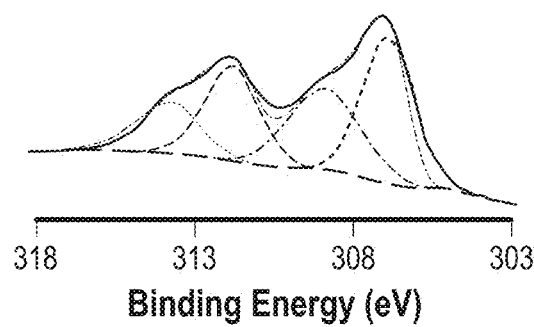
Figure 14B:
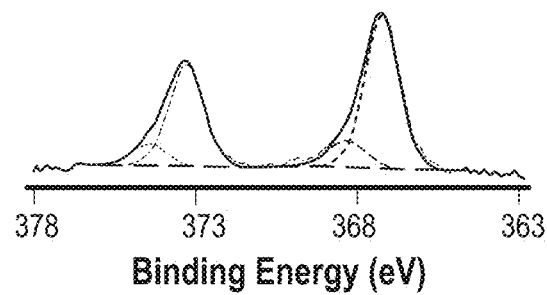
Figure 15A:
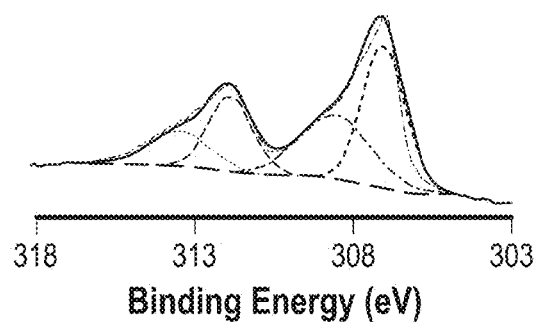
Figure 15B:
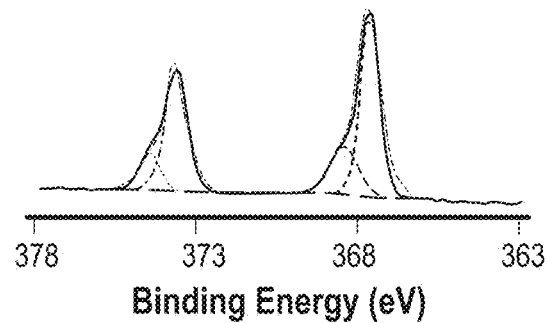

FIGS. 12A-12B are images of the (FIG. 12A) Rh 3d and (FIG. 12B) Au 4f XPS spectra for 2:1 Rh:Ag alloy nanoparticles. FIGS. 13A-13B are images of the (FIG. 13A) Rh 3d and (FIG. 13B) Au 4f XPS spectra for 1:1 Rh:Ag alloy nanoparticles. FIGS. 14A-14B are images of the (FIG. 14A) Rh 3d and (FIG. 14B) Au 4f XPS spectra for 1:2 Rh:Ag alloy nanoparticles. FIGS. 15A-15B are images of the (FIG. 15A) Rh 3d and (FIG. 15B) Au 4f XPS spectra for 1:3 Rh:Ag alloy nanoparticles.

Figure 16A:
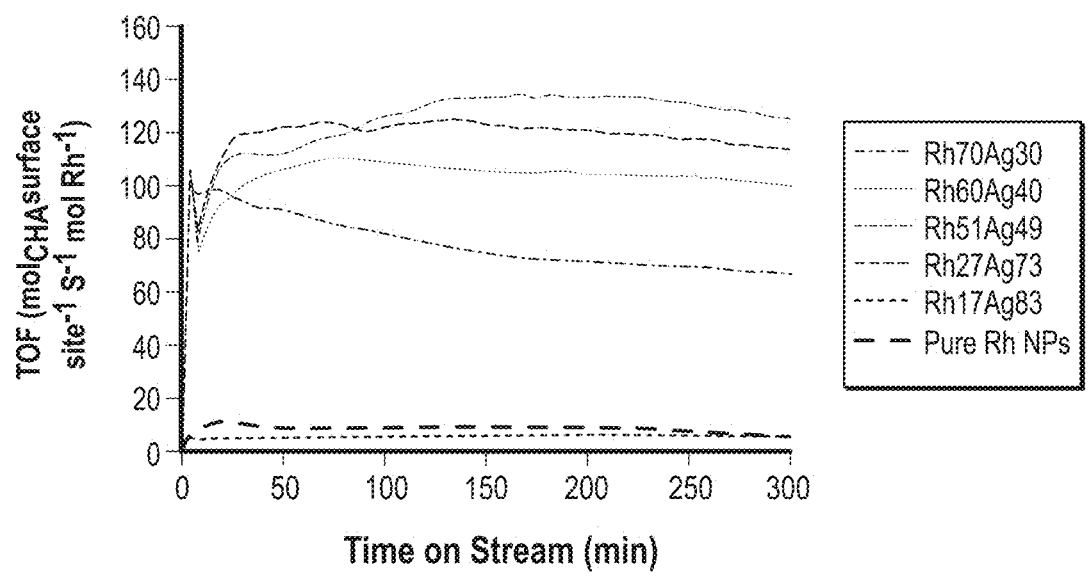
FIGS. 16A-16B are images of the turnover frequency (TOF) plot for Rh:Ag Alloy NPs.
Figure 16B:
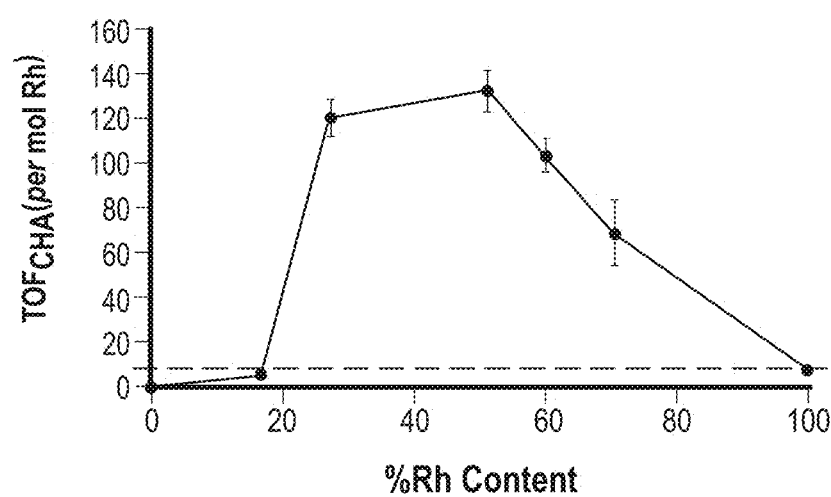

FIGS. 16A-16B are images of the turnover frequency (TOF) plot for Rh:Ag Alloy nanoparticles. FIG. 16A shows the turnover frequency plot for cyclohexene hydrogenation using 1:1 Rh:Ag alloy nanoparticles, 2:1 Rh:Ag alloy nanoparticles, 3:1 Rh:Ag alloy nanoparticles, 1:3 Rh:Ag alloy nanoparticles, and 1:2 Rh:Ag alloy nanoparticles. FIG. 16B shows the steady state turnover frequency with the percent Rh across the bottom.

Figure 17A:
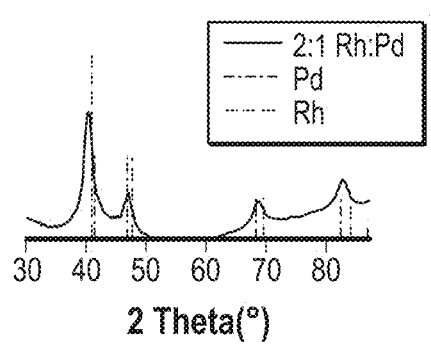
FIGS. 17A-17F are images of the XRD spectrum, the UV-vis spectrum, the XPS spectrum for Rh, the XPS spectrum for Pd and TEM images (respectively) for Rh:Pd Alloy NPs.
Figure 17B:
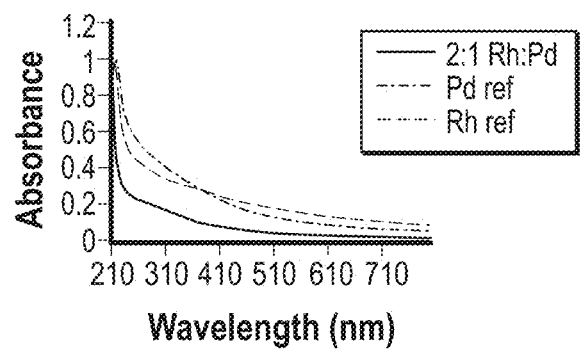
Figure 17C:
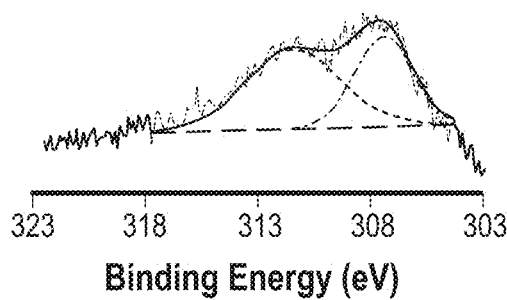
Figure 17D:
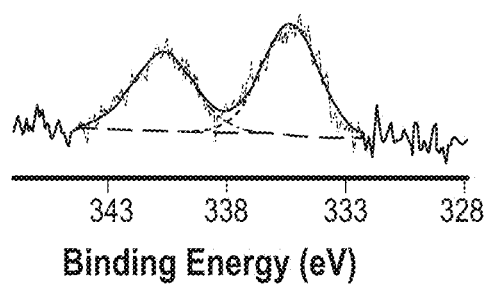
Figure 17E:
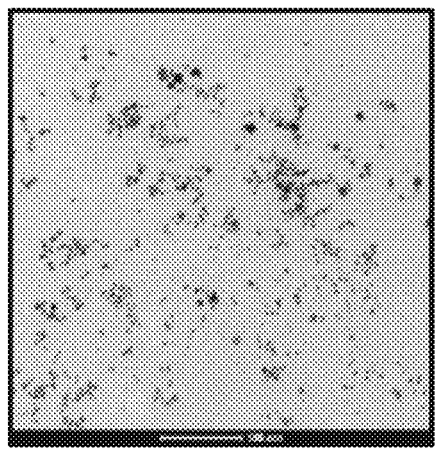
Figure 17F:
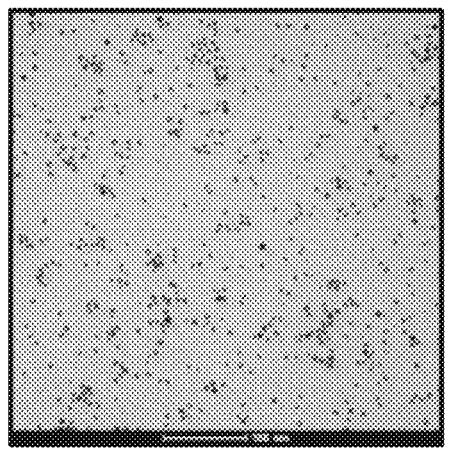

FIGS. 17A-17F are images of the XRD spectrum, the UV-vis spectrum, the XPS spectrum for Rh, the XPS spectrum for Pd and TEM images (respectively) for Rh:Pd Alloy NPs. FIGS. 17A-17B are XRD data and absorbance spectrum for 2:1 Rh:Pd alloy nanoparticles and Rh and Pd seeds. FIGURES 17C-17D are images of the XPS spectra for Rh:Pd (2:1) alloy nanoparticles for Rh 3d and Pd 3d respectively. FIGS. 17E-17F are TEM images of 2:1 Rh:Pd alloy nanoparticles and 1:1 Rh:Pd nanoparticles respectively.

Figure 18A:
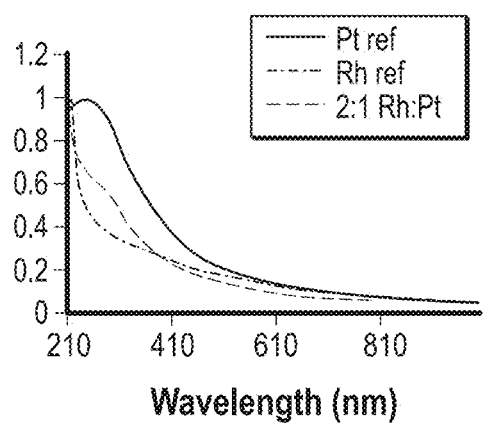
FIGS. 18A-18E are images of the UV-vis spectrum, the XRD spectrum, the XPS spectrum for Rh, the XPS spectrum for Pt and TEM image, (respectively) for Rh:Pt (2:1) alloy nanoparticles.
Figure 18B:
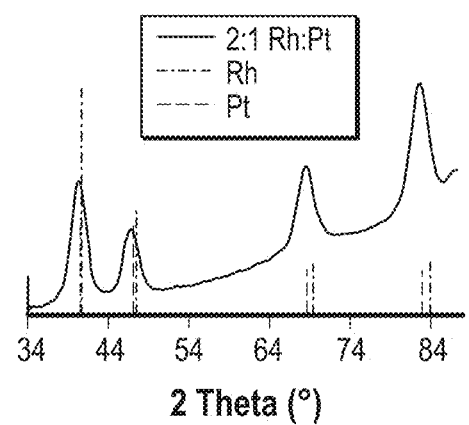
Figure 18C:
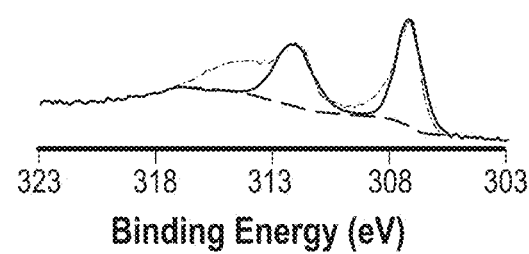
Figure 18D:
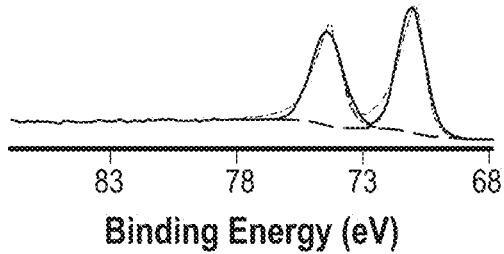
Figure 18E:
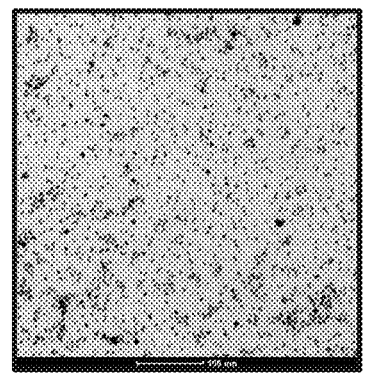

FIGS. 18A-18E are images of the UV-vis spectrum, the XRD spectrum, the XPS spectrum for Rh, the XPS spectrum for Pt and TEM image, (respectively) for Rh:Pt (2:1) alloy nanoparticles. FIGS. 18A and 18B are absorbance spectrum and XRD data for 2:1 Rh:Pt alloy nanoparticles and Rh and Pt reference. FIGS. 18C-18D are images of the XPS spectra for Rh 3d and Pt 4f respectively. FIG. 18E is a TEM image of 2:1 Rh:Pt alloy nanoparticles.

Figure 19A:
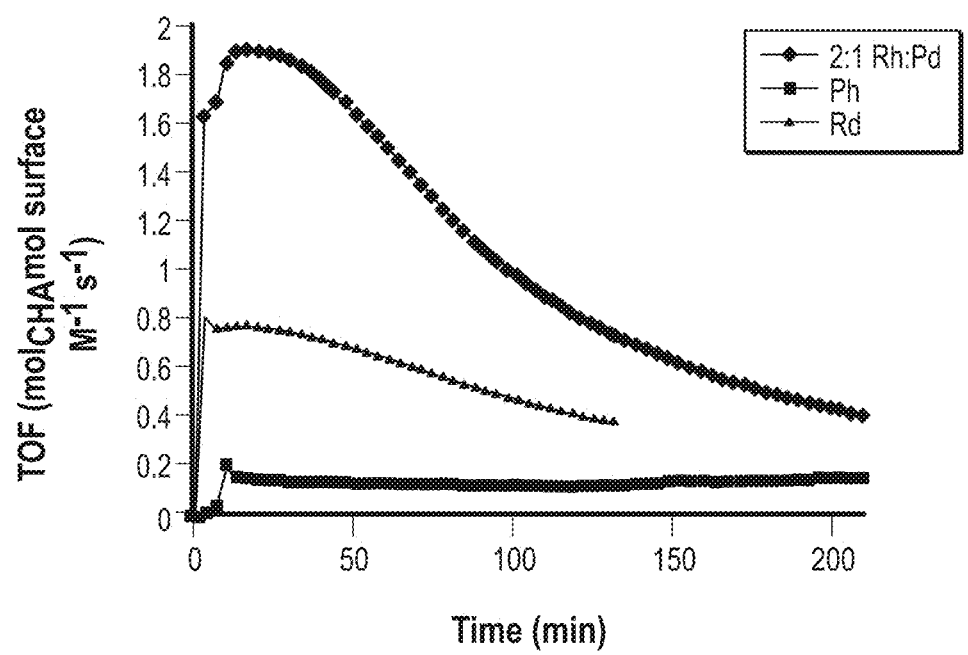
FIGS. 19A-19B are images of the catalytic activity by the turnover frequency (TOF) plot for Rh:Pd and Rh:Pt Alloy NPs.
Figure 19B:
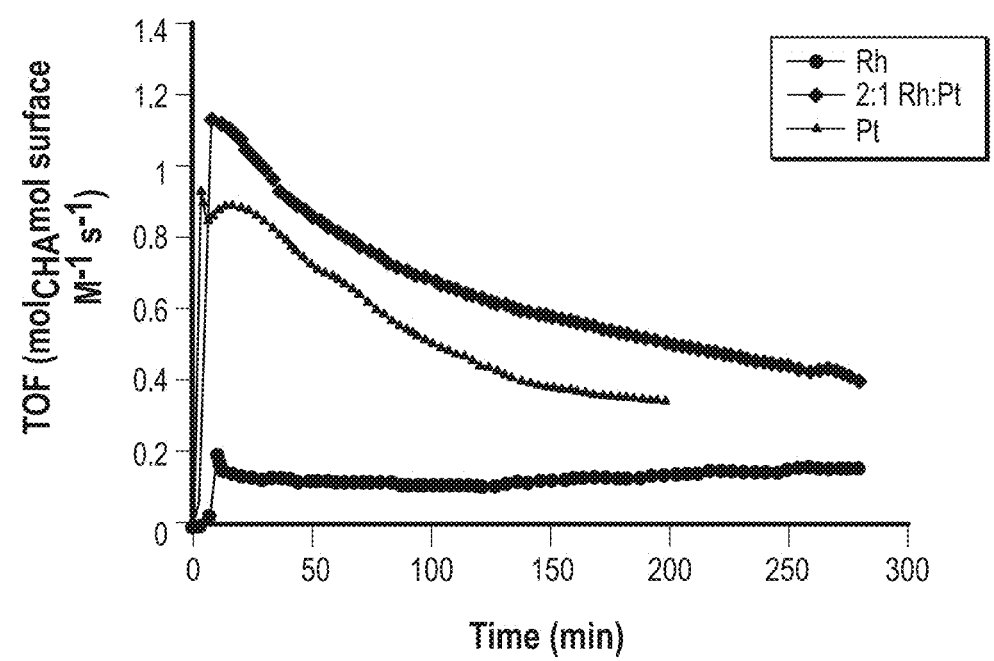

FIGS. 19A-19B are images of the catalytic activity by the turnover frequency (TOF) plot for Rh:Pd and Rh:Pt Alloy NPs. FIG. 19A shows the catalysis turnover frequency for 2:1 Rh:Pd alloy nanoparticles and the Rh and Pd references and FIG. 19B shows catalysis turnover frequency for 2:1 Rh:Pt alloy nanoparticles and the Rh and Pt references.

Figure 20A:
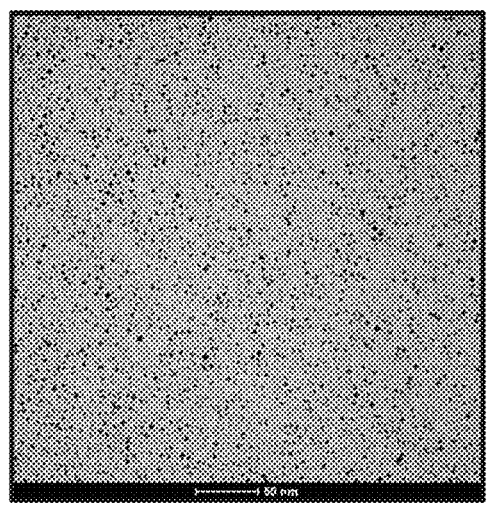
FIGS. 20A-20B are TEM image and XRD spectrum of Pd:Au (1:1) Alloy NPs.
Figure 20B:
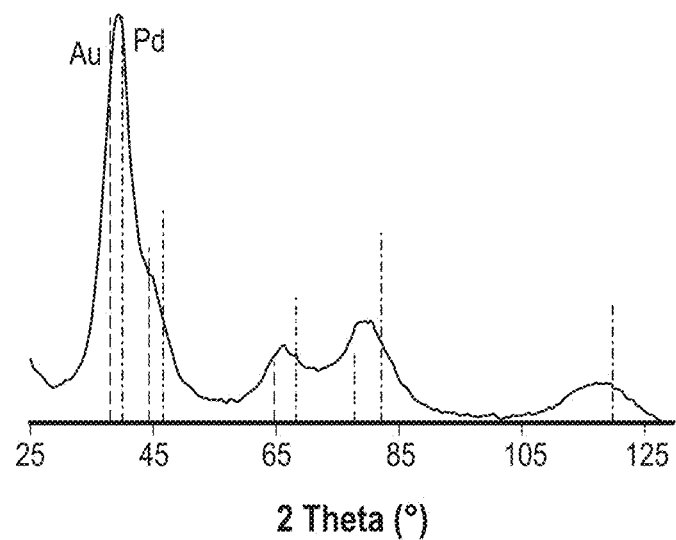

FIG. 20A shows a TEM image for 1:1 Pd:Au alloy nanoparticles. FIG. 20B shows XRD data for 1:1 Pd:Au alloy nanoparticles.

Transmission Electron Microscopy (TEM) images were obtained from a FEI Tecnai microscope operating at 80 kV. The samples were prepared by drop-casting a single aliquot of nanoparticles dispersed in ethanol onto 200 mesh carbon coated copper Formvar® grids (Ted Pella, Inc.) and allowing for subsequent evaporation in air. Nanoparticle sizes and standard deviations were derived by measuring a minimum of 200 individual particles per experiment, and by averaging multiple images from samples obtained from at least two separate syntheses. Individual particles were measured using Image-J, which finds the area of each nanoparticle by pixel counting. High-resolution TEM (HRTEM) and energy dispersive X-ray analysis (EDX) were performed using a JEOL 2010F transmission electron microscope. This instrument was operated at 200 keV using a field-emission gun with 0.19 nm point-to-point resolution. Powder X-ray diffraction patterns were recorded with a Bruker AXS D8 diffractometer using a Cu Ka source (1.5418 A) operated at 40 kV and 40 mA spectra were collected using a scan speed of 3° min$^{-1}$ with a step width of 0.020 (20). UV-vis data were collected using a Carry 6000i UV-vis NIR spectrometer equipped with a double beam and a wavelength range of 175-3300 nm. X-ray photoelectron spectroscopy (XPS) was performed using a Kratos Axis Ultra Photoelectron Spectrometer. The XPS spectra were recorded utilizing a monochromated Al-Ka x-ray source (hy=1486.5 eV), hybrid optics (employing a magnetic and electrostatic lens simultaneously) and a multi-channel plate coupled to a hemispherical photoelectron kinetic analyzer. All spectra were recorded using four sweeps for signal averaging, a dwell time of 1800 msec, an aperture slot of 300×700 μm, a pass energy of 20 eV and 0.1 eV per step. To minimize sample charging and band shape distortion due to charging, the XPS spectra were recorded using the Kratos charge neutralizer (20 eV electrons) while the sample stage was left floating (i.e. not connected to ground (earth)). Casa XPS analysis software was used for peak deconvolution and the stoichiometry of samples was determined from corrected peak areas and employing Kratos sensitivity factors for each element of interest.

Rh:Au Alloy NPs. A solution of poly(vinylpyrrolidone) (200 mg, 1.8 mmol) and sodium borohydride (21 mg, 0.56 mmol) in ethylene glycol (15.0 mL) was prepared directly in the reaction vessel and brought to 150° C. with stirring. A second solution consisting of HAuCl$_4$.3H$_2$O (41 mg, 0.10 mmol) and RhCl$_3$.x H$_2$O (22 mg, 0.10 mmol) was prepared in the same solvent (5.0 mL) and loaded into a fresh 10 mL disposable syringe. Half of the metal precursors solution (2.5 mL) was injected into the hot stirred PVP/NaBH$_4$ solution at a rate of 300 mL h-1. The color of the solution became rapidly reddish brown. The mixture was stirred for an additional 30 minutes at 150° C. after the precursor was added. After this period, the remaining metal solution (2.5 mL) was added at a rate of 20 mL h$^{-1}$ and the reaction stirred at the same temperature for 30 minutes after completion of the metal solution. The reaction was then cooled rapidly by transferring the reaction vessel to an ice-water bath. The Au/Rh NPs were precipitated by adding acetone (ca. 60 mL) to give a red brown suspension, which was briefly sonicated (<1 min) The precipitate was then isolated by ultracentrifugation (5 krpm, 5 min) and the colorless supernatant was decanted away to leave a brown solid. This was further purified to remove excess PVP and ethylene glycol by 2 cycles of dissolution in ethanol (10 mL) followed by precipitation with hexane (70 mL) and isolation by centrifugation.

Rh:Au and 1:3 Rh—Au Alloy NPs. The above procedure was followed using NaBH$_4$ (20-30 mg, 0.55-0.84 mmol) and RhCl$_3$.x H$_2$O (22 mg, 0.10 mmol). The amount of HAuCl$_4$.3H$_2$O (84 mg, 0.22 mmol and 113 mg, 0.29 mmol) varied according to the target ratio using the molar amount of Rh$^{3+}$ fixed as an anchor. The exact same volumes and addition rates were used. During the purification stage, the particles underwent 3 cycles of ethanol dissolution/hexane precipitation.

2:1 Rh—Au and 3:1 Rh—Au Alloy NPs. Similarly, when the Rh:Au ratio was increased, the amount of HAuCl$_4$.3H$_2$O used remained constant, serving as an anchor (40 mg, 0.10 mmol). Thus, the amount of NaBH$_4$ employed remained the same as well (22 mg, 0.55 mmol). The amount of Rh precursor was systematically increased in order to reach the target ratio (43-62 mg, 0.20 mmol-0.30 mmol). All volumes and addition rates were kept constant and the particles were purified as previously seen for 1:1 Rh—Au alloy NPs.

Rh—Ag Alloy NPs. A solution of poly(vinylpyrrolidone) (366 mg, 3.29 mmol) in ethylene glycol (20.0 mL) was prepared directly in the reaction vessel and brought to 150° C. with stirring. Once the temperature was reached, 25 μM HCl in the same solvent (1.5 mL) was added very quickly to the hot solution. Two separate solutions of RhCl$_3$.x HO (29 mg, 0.14 mmol) in ethylene glycol (5.0 mL) and AgNO$_3$ (24 mg, 0.14 mmol) in 5.0 mL of the same solvent were prepared and loaded into separate fresh 10.0 mL syringes. The solutions were then added separately but simultaneously, at a rate of 150 mL h$^{-1}$, 5 minutes after the acid addition. The color of the solution rapidly changed to brown. The mixture was stirred for an additional 30 minutes at 150° C. after the precursor was added. After this period, the reaction was quenched in an ice water bath and precipitated by adding acetone (105.0 mL). The Rh/Ag precipitate was then collected by centrifugation (5 krpm, 5 min). The NPs underwent 2 cycles of ethanol (15.0 mL) dispersion and hexane (105.0 mL) precipitation. Shorter and slower centrifugation periods (2.5 krpm, 3 min) were employed in this stage in order to avoid agglome. Finally, the NPs were redispersed in 15.0 mL water and treated with 6.0 mL NH4OH (29.14% assay) followed by centrifugation (8.5 krpm, 15 min) in order to remove any AgCl that may have formed during the synthetic process.

1:2 and 1:3 Rh—Ag Alloy NPs. As described above, a solution of PVP (400-450 mg, 3.60-4.05 mmol) in ethylene glycol (20.0 mL) was heated to 150° C. using microwave irradiation. The above procedure was then followed but the amount of AgNO$_3$ (50-73 mg, 0.29-0.43 mmol) and HCl (3.0 mL) added varied depending on the target ratio, leaving the molar amount of Rh$^{3+}$ as a fixed anchor. The exact same volumes and addition rates were employed. The purification steps remained the same as well.

2:1 and 3:1 Rh—Ag NPs. Following the same procedure described for 1-1 Rh—Ag, solutions of the metal precursors were added to a hot solution of PVP in ethylene glycol after a very dilute HCl solution in the same solvent was added. In this case, the molar amount of $Ag^+$ (25 mg, 0.15 mmol) was used as the anchor, while the amount of $Rh^{3+}$ precursor (61-87 mg, 0.29-0.42 mmol) added was varied in order to achieve a target composition. The purification steps were carried out as explained above.

Catalytic Studies. The catalysts were prepared by addition of pre-calcined $SiO_2$ (200 mg) to suspensions of 8-12 mg of PVP-capped RhAg and RhAu NPs in ethanol/$H_2O$ (1:1). The slurries were sonicated for 20 min., isolated by filtration, washed with ethanol/$H_2O$, and dried at 70° C. For each catalytic study, a small amount of the composite catalyst (ca. 5-15 mg) was loaded into a custom made quartz U-tube, suspended above a D3-porosity frit. The sample was mixed in with acid washed and calcined sand, heated to 25° C. and then the sample and entire reactor line (quartz, heated to 90° C.) was purged with the reactant gas mixture ($H_2$/He 1:1) for 30 min. Catalysis began with the introduction of cyclohexene vapor into the gas stream via an in-line saturator fitted with fritted bubbler. All data was obtained in-real-time by automated pneumatically-gated sampling of the exhaust stream, directly into an HP Agilent 6890 GC fitted with Restex Stabiliwax 15 m column and tandem FID and TCD detectors. Activity and turnover frequency values were obtained based on estimated surface area-to-volume ratios (by TEM). Activation energies were determined by collection of steady-state activity values at five temperatures (in the range 5-30° C.).

It is contemplated that any embodiment discussed in this specification can be implemented with respect to any method, kit, reagent, or composition of the invention, and vice versa. Furthermore, compositions of the invention can be used to achieve methods of the invention.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

All of the compositions and/or methods disclosed and claimed herein can be made and executed without undue experimentation in light of the present disclosure. While the compositions and methods of this invention have been described in terms of preferred embodiments, it will be apparent to those of skill in the art that variations may be applied to the compositions and/or methods and in the steps or in the sequence of steps of the method described herein without departing from the concept, spirit and scope of the invention. All such similar substitutes and modifications apparent to those skilled in the art are deemed to be within the spirit, scope and concept of the invention as defined by the appended claims.

The invention claimed is:

1. A method of making a bimetallic randomly alloyed nanoparticle catalyst comprising the steps of:
   providing a reaction vessel;
   adding a reaction mixture comprising a first solution of poly(vinylpyrrolidone) and a suitable reducing agent in a first solvent to the reaction vessel;
   heating the reaction mixture using a microwave;
   adding a first metal precursor solution comprising a first metal-precursor-complex comprising Rh, Jr, Pd, Pt, Ni, Ag, or Au to the reaction mixture;
   adding a second metal precursor solution comprising a second metal-precursor-complex comprising Ru, Co, Jr, Ni, Pd, Pt, Ag, Au, or a combination thereof to the reaction mixture;
   wherein the first metal-precursor-complex and the second metal-precursor-complex are provided at a bimetallic ratio of from 1:9 to 9:1;
   forming a bimetallic randomly alloyed nanoparticle comprising a first metal and a second metal, the first metal being that of the first metal-precursor-complex and the second metal being that of the second metal-precursor complex, the bimetallic randomly alloyed nanoparticle having a random distribution of the first metal and the second metal at the bimetallic ratio therein;
   purifying the bimetallic randomly alloyed nanoparticle;
   forming a suspension comprising a poly(vinylpyrrolidone)-capped metal complex and the purified bimetallic randomly alloyed nanoparticle; and
   adding a pre-calcined $SiO_2$ to the suspension comprising the poly(vinylpyrrolidone)-capped metal complex and the purified bimetallic randomly alloyed nanoparticle, thereby forming the bimetallic randomly alloyed nanoparticle catalyst.

2. The method of claim 1, wherein the one or more bimetallic randomly alloyed nanoparticles have a bimetallic ratio of about 1:1; 1:2; 1:3; 2:1; or 3:1.

3. The method of claim 1, wherein the bimetallic randomly alloyed nanoparticle comprises a Rh:Pd bimetallic randomly alloyed nanoparticle; a Rh:Pt bimetallic randomly alloyed nanoparticle; a Rh:Ag bimetallic randomly alloyed nanoparticle; a Rh:Au bimetallic randomly alloyed nanoparticle; a Rh:Ru bimetallic randomly alloyed nanoparticle; a Rh:Co bimetallic randomly alloyed nanoparticle; a Rh:Ir bimetallic randomly alloyed nanoparticle; a Rh:Ni bimetallic randomly alloyed nanoparticle; a Ir:Pd bimetallic randomly alloyed nanoparticle; a Ir:Pt bimetallic randomly alloyed nanoparticle; a Ir:Ag bimetallic randomly alloyed nanoparticle; a Ir:Au bimetallic randomly alloyed nanoparticle; a Pd:Ni bimetallic randomly alloyed nanoparticle; a Pd:Pt bimetallic randomly alloyed nanoparticle; a Pd:Ag bimetallic randomly alloyed nanoparticle; a Pd:Au bimetallic randomly alloyed nanoparticle; a Pt:Ni bimetallic randomly alloyed nanoparticle; Pt:Ag bimetallic randomly alloyed nanoparticle; a Pt:Au bimetallic randomly alloyed nanoparticle; a Ni:Ag bimetallic randomly alloyed nanoparticle; a Ni:Au bimetallic randomly alloyed nanoparticle; a Ag:Au bimetallic randomly alloyed nanoparticle; or a combination thereof.

4. The method of claim 1, wherein the bimetallic randomly alloyed nanoparticle is a Rh:Au bimetallic randomly alloyed nanoparticle with a bimetallic ratio of about 1:1, 1:2, 1:3, 2:1, or 3:1; a Rh:Ag bimetallic randomly alloyed nanoparticle with a bimetallic ratio of about 1:1, 1:2, 1:3, 2:1, or 3:1; a Rh:Pd bimetallic randomly alloyed nanoparticle with a bimetallic ratio of about 1:1, 1:2, 1:3, 2:1, or 3:1; or a Rh:Pt bimetallic randomly alloyed nanoparticle with a bimetallic ratio of about 1:1, 1:2, 1:3, 2:1, or 3:1.

5. The method of claim 1, wherein the bimetallic randomly alloyed nanoparticle is a Rh:Au bimetallic randomly alloyed nanoparticle with a bimetallic ratio of about 2.33:1, 1.78:1, 1:1.2, 1:3.35, or 1:5.67.

6. The method of claim 1, wherein the bimetallic randomly alloyed nanoparticle is a Rh:Ag bimetallic randomly alloyed nanoparticle with a bimetallic ratio of about 2.33:1, 1.5:1, 1.04:1, 1:2.7, 1:3.35. 1:4.88, or 1:1.2.

7. The method of claim 1, wherein the bimetallic randomly alloyed nanoparticle is a Rh:Pd bimetallic randomly alloyed nanoparticle with a bimetallic ratio of about 1:3, 1:2, 1:1, 2:1, or 3:1; or wherein the bimetallic randomly alloyed nanoparticle is a Rh:Pt bimetallic randomly alloyed nanoparticle with a bimetallic ratio of about 1:3, 1:2, 1:1, 2:1, or 3.1.

8. The method of claim 1, further comprising the step of loading the bimetallic randomly alloyed nanoparticle catalyst into a quartz U-tube suspended above a porosity frit.

9. The method of claim 1, further comprising the steps of sonicating, isolating, washing, and drying the bimetallic randomly alloyed nanoparticle.

\* \* \* \* \*

UNITED STATES PATENT AND TRADEMARK OFFICE
CERTIFICATE OF CORRECTION

Page 1 of 1

PATENT NO. : 10,960,470 B2
APPLICATION NO. : 14/782844
DATED : March 30, 2021
INVENTOR(S) : Simon M. Humphrey It is certified that error appears in the above-identified patent and that said Letters Patent is hereby corrected as shown below:

In the Claims

Column 14, Claim 1, Line 32-33 should read:
"...metal-precursor-complex comprising Rh, Ir, Pd, Pt, Ni, Ag, or Au to the reaction mixture;..."

Column 14, Claim 1, Lines 35-36 should read:
"...second metal-precursor-complex comprising Ru, Co, Ir, Ni, Pd, Pt, Ag, Au, or a combination thereof to the..."

Column 14, Claim 2, Lines 57-59 should read:
"The method of claim 1, wherein the bimetallic randomly alloyed nanoparticle has a bimetallic ratio of about 1:1; 1:2; 1:3; 2:1; or 3:1."

Signed and Sealed this
Eighteenth Day of May, 2021

Drew Hirshfeld
*Performing the Functions and Duties of the
Under Secretary of Commerce for Intellectual Property and
Director of the United States Patent and Trademark Office*